United States Patent
Fujibayashi

(10) Patent No.: US 7,152,183 B2
(45) Date of Patent: Dec. 19, 2006

(54) METHOD AND APPARATUS FOR VOLUME REPLICATION MANAGEMENT AT PLANNED AND UNPLANNED LINK DOWN

(75) Inventor: Akira Fujibayashi, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 454 days.

(21) Appl. No.: 10/719,286

(22) Filed: Nov. 20, 2003

(65) Prior Publication Data

US 2005/0114410 A1    May 26, 2005

(51) Int. Cl.
*G06F 11/00* (2006.01)
(52) U.S. Cl. .......................................... 714/6
(58) Field of Classification Search ................ 714/6
See application file for complete search history.

(56) References Cited

U.S. PATENT DOCUMENTS

| | | |
|---|---|---|
| 5,504,861 A | 4/1996 | Crockett et al. |
| 5,835,953 A | 11/1998 | Ohran |
| 5,857,208 A | 1/1999 | Ofek |
| 5,928,367 A | 7/1999 | Nelson et al. |
| 6,260,124 B1 | 7/2001 | Crockett et al. |
| 6,408,370 B1 | 6/2002 | Yamamoto |
| 6,543,001 B1 | 4/2003 | LeCrone et al. |
| 6,578,120 B1 | 6/2003 | Crockett et al. |
| 6,611,901 B1* | 8/2003 | Micka et al. ............... 711/162 |
| 2003/0126107 A1 | 7/2003 | Yamagami |
| 2003/0135650 A1 | 7/2003 | Kano et al. |
| 2003/0177321 A1 | 9/2003 | Watanabe |
| 2004/0236983 A1* | 11/2004 | Burton et al. .................. 714/6 |

FOREIGN PATENT DOCUMENTS

EP    0981091 A2    2/2000

OTHER PUBLICATIONS

Blunden et al. "Implementing ESS Copy Services on S/390," IBM Redbook, IBM Corporation, San Jose, California (2000).
"Hitachi Freedom Storage™ Software Solutions Guide," Hitachi Data Systems Corporation Santa Clara, California (2003).

* cited by examiner

*Primary Examiner*—Robert Beausoliel
*Assistant Examiner*—Charles Ehne
(74) *Attorney, Agent, or Firm*—Townsend and Townsend and Crew LLP

(57) ABSTRACT

A technique for restoring data after suspension of a communications link between two storage systems is disclosed. Upon suspension of the link, an image of the data at the first and second locations is created in a secure location. While the link is down, updates to the data at each of the first and second locations are maintained separately. Upon reestablishment of a communications link, the two locations are again synchronized.

16 Claims, 18 Drawing Sheets

METHOD AND APPARATUS FOR VOLUME REPLICATION MANAGEMENT AT PLANNED AND UNPLANNED LINK DOWN

BACKGROUND OF THE INVENTION

This invention relates to systems for storing data, and in particular to volume replication in storage area networks. Large storage systems are now well known in which primary and secondary storage systems are provided for a data center or other similar need. The primary and secondary volumes are sometimes also referred to as production and replica volumes, respectively. In such storage systems the primary and secondary storage systems (or subsystems) are linked, for example, using a communications link such as an optical fiber, the Internet, or other well known data communication pathway. The purpose of linking such systems is to assure that an extra copy of data is available at a remote location. This assures that a natural disaster, a failure of the data link, a failure of one or the other storage systems, or other event, does not preclude the system from having useful data.

The volume replication function has become popular as a fundamental function to prevent the need to stop a computer application when a storage system failure occurs. Such failures would otherwise require a delay while the data is restored from back-up tapes or the like. It is also important to have a restore function from the secondary volume to the primary volume when any data loss occurs on the primary volume. It is also a desirable use of this function to reuse the replica volume for other purposes, for example, reporting, testing, back-ups, migration to new systems, etc., without impacting the primary volume.

When the link between the primary (production) volume and the secondary (replica) volume is suspended due to a planned or unplanned event, each of the primary and secondary volumes will be used for their own purposes, i.e. the data on each will not necessarily correspond to the data on the other volume. In other words, by loss of the link between them, the system is at least temporarily deprived of any logical method to synchronize the two volumes. Furthermore, once suspended, subsequently occurring writes will occur between the primary and secondary volumes as each volume is updated for other purposes. Once the integrity of the system is reestablished, i.e., the data link is restored, then it is desirable to be able to resynchronize the primary and secondary volumes.

Examples of prior art approaches to restoring the volumes include a description in the IBM Redbook, see, e.g. pages 23 to 27. Another solution is found in the Hitachi Freedom Storage Software Solution Guide at pages 28 to 38. In addition, the copy function in Hitachi systems is also described in U.S. Pat. No. 6,408,370 and in European EP 0981091 A2.

BRIEF SUMMARY OF THE INVENTION

In the case of a communications link failure between a primary and a secondary volume in the storage system, this invention provides for restoration of the data as necessary to resynchronize both the primary and the secondary volumes. In a first approach, upon interruption of the link, a point-in-time volume image is maintained which is a representation of the data at each of the primary and secondary systems at the time the link was interrupted. In a first approach to achieving this, the point-in-time volume image at the time of link suspension may be maintained by using a bitmap table for memorizing which blocks of data are to be copied to a reserved area. All data on the volume is copied to the reserved area before any updates are used to write over the blocks copied to the reserved area. In this manner the reserved area will have an image of the data as of the time of link suspension. Subsequent input/output operations which update either the primary volume or the secondary volume after the time of suspension are tracked and recorded.

In another approach for obtaining the point-in-time volume image, if the volume replication function uses log-based volume management, the memorized log sequence number (or its time stamp) at the time of suspension can be used. Thus, the base volume image together with all the logs until that sequence number will enable recovery of the volume image at the time point of the suspension. Another approach, suitable for some uses is to maintain an "old data table." This table contains all of the data up to the writes occurring just after the link suspension. Using the old data table enables recovery of the volume image at the time of suspension. Finally, another approach is to use the old data tracking log. This tracks the old data as a log on each update to the volume. The choice of which of these methods is employed can be user selectable, or controlled by the storage system administrator, or even controlled dynamically.

Preferably, in a system having a primary storage volume having first data stored thereon and a secondary storage volume having second data stored thereon, the primary storage volume coupled to the secondary storage volume by a communications link, a method is provided for restoring data after a suspension of the link. The method includes the steps of: upon suspension of the link, maintaining a first image of the first data stored on the primary volume and maintaining a second image of second data stored on the secondary volume. Then updates to the first data and updates to the second data after suspension of the link are tracked. Next the image of the first data is revised to account for the updates to thereby provide a complete first data image for use when the link is restored. The image of the second data is revised to account for the updates to it thereby provide a complete second data image for use when the link is restored. Finally data is copied between the primary volume and the secondary volume when the link is restored to thereby resynchronize the primary volume and the secondary volume.

DETAILED DESCRIPTION OF THE INVENTION

Figure 1:
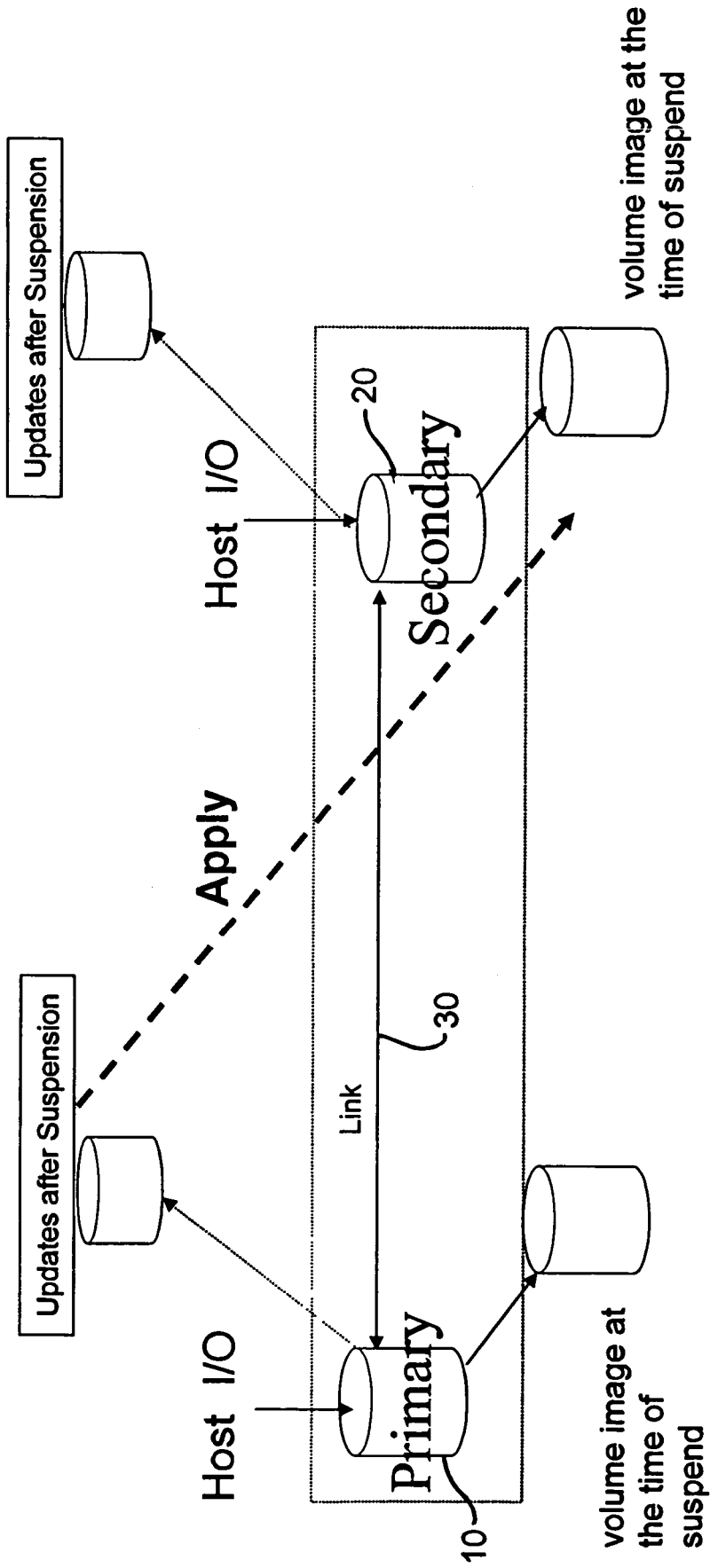
FIG. 1 is a diagram illustrating an overall system and resynchronization of the suspended paired volumes.

FIG. 1 is a diagram illustrating an overall configuration for resynchronization of suspended paired volumes. Shown in FIG. 1 are a primary volume 10 and a secondary volume 20 coupled by a link 30. Volumes 10 and 20 will typically be hard disk drives or storage systems containing numerous hard disk drives, while link 30 is provided by any conventional data transfer path, e.g. FibreChannel, the internet, etc. For typical remote replication functionality, link 30 will typically be a link between the two storage systems such as FibreChannel, ESCON, Ethernet, ATM, Sonet, etc. In addition, the link may also be provided by data transfer logic and receiver logic for temporarily stored data, for example in a cache memory or a buffer memory. As will be apparent, the exact implementation for the link 30 is not significant with respect to a conceptual level understanding of the invention described below.

Volumes 10 and 20 are typically configured as primary (P) and secondary (S) volumes, where the primary volume is the production volume and the secondary volume is a paired volume for replication purposes. While only one secondary volume is illustrated in FIG. 1, any desired number may also be implemented. In addition, depending upon the partitioning employed, the secondary volume may even be provided on the same disk drive, subsystem or other media as the primary volume. (Of course this is generally not done because it renders the system susceptible to a single point failure should that volume become inoperable.) In different implementations, the secondary volume may be provided by a table of pointers to locations where the desired data presently resides, to a data storage area, and to an area where the data is to be copied.

As also shown in FIG. 1, at the time of the suspension as caused by a planned or unplanned failure of the link 30, a copy is made of the primary volume image. Updates to the data stored on the primary volume after that time are also stored. These same events occur at the secondary volume 20.

Once a suspension of the link occurs, the primary and secondary volumes will be used for their own purposes to read and write data as requested by any host coupled to them. When the link is restored, the user or system administrator typically will want to resynchronize the two volumes. As will be explained in detail below, there are different techniques for this, but in general, one must copy the updates which occur on the primary side to the secondary side and vice versa. During this operation, volume consistency may be lost because the copying process may ignore the order of the updates which occur on the primary volume. Furthermore, if failure happens to the secondary volume during this resynchronization process, consistency may also be lost. This invention provides consistent volume images between the primary and secondary volumes. This is enabled by maintaining an image of the volume at the time when the link is suspended. After that time, the updates made to both the primary and secondary volumes are tracked and recorded.

Figure 2:
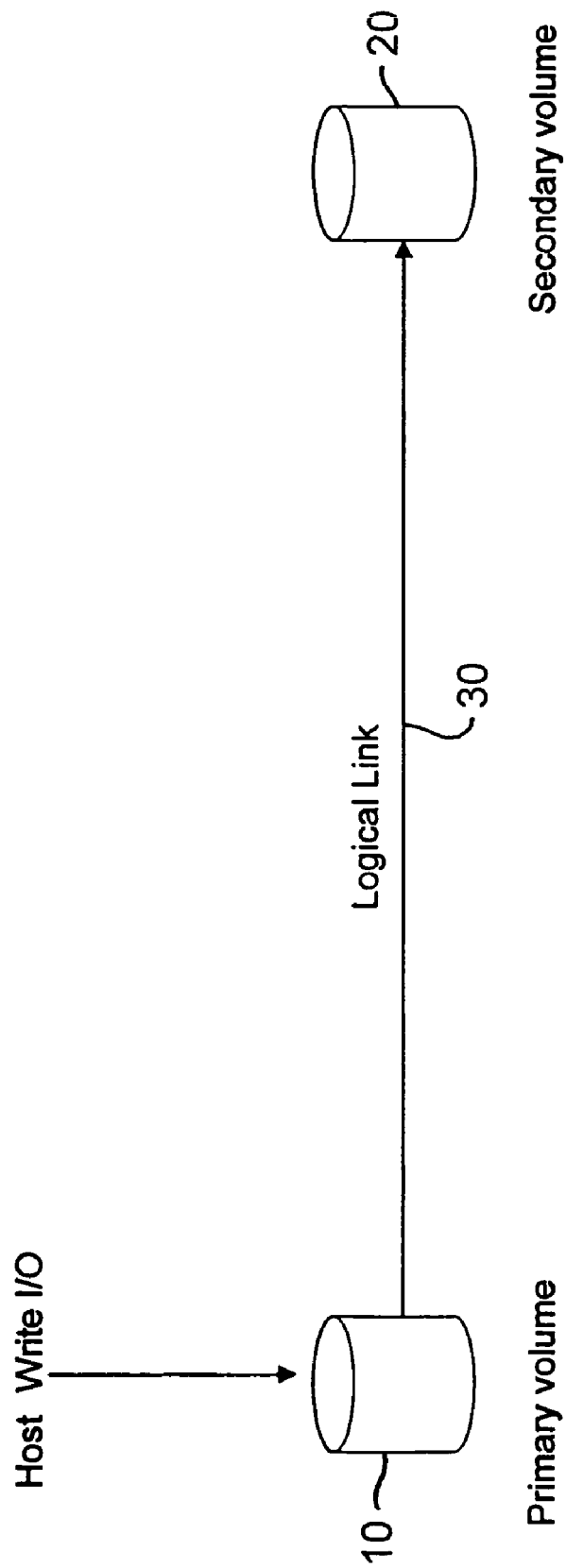
FIG. 2 is a diagram illustrating the logical configuration of volume replication.

FIG. 2 is a diagram illustrating the logic of volume replication. As shown there, host write operations to the primary volume 10 are replicated over link 30 to the secondary volume 20.

Figure 3A:
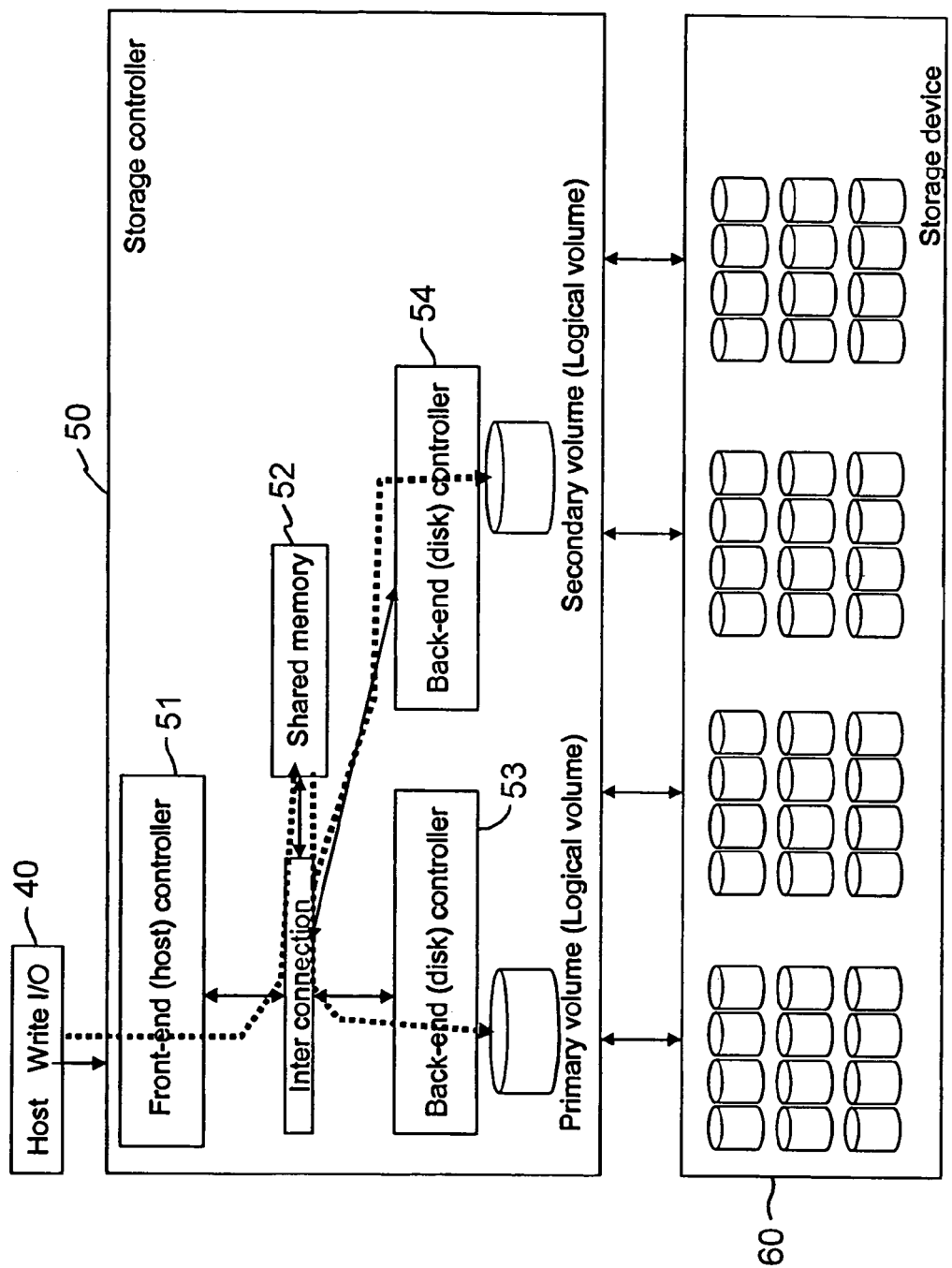
FIG. 3a and 3b illustrate physical system configurations corresponding to FIG. 2.
Figure 3B:
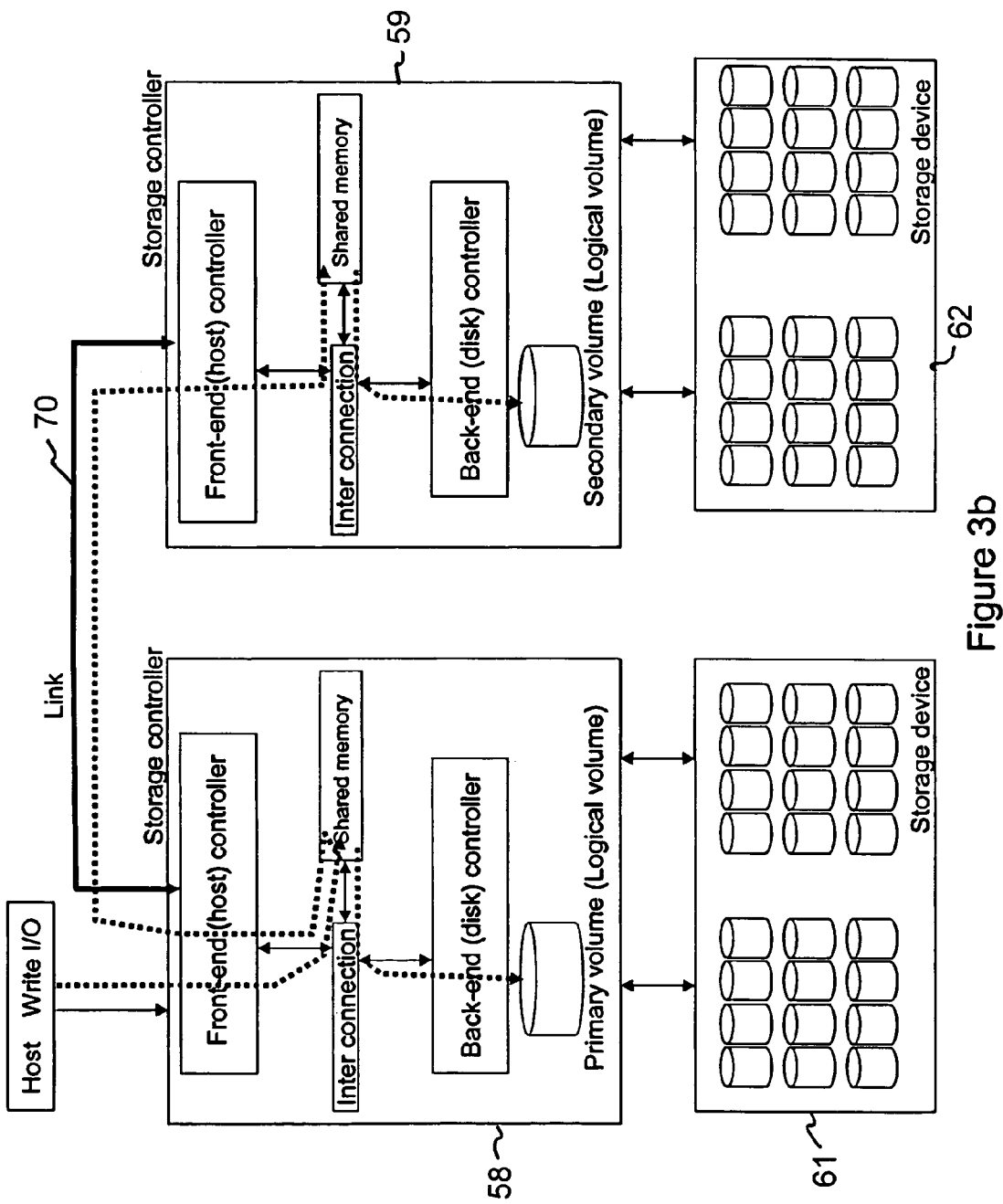

FIGS. 3a and 3b illustrate physical system configurations corresponding to the simplified diagram of FIG. 2. As shown in FIG. 3a, host 40 sends I/O requests to a storage controller 50 which interacts with a storage device 60. Storage controller 50 includes a front end portion 51 interconnected to a shared memory 52. It also includes back-end disk controllers 53 and 54 connected to the array of hard disk drives. Disk controller 53 interacts with the primary volumes, while disk controller 54 interacts with the secondary volumes. Writes from the host are sent by the controller 51 through the interconnections to the shared memory for storage (or buffering), and then supplied to the disk controllers 53 and 54 for being written to the respective storage devices 60.

FIG. 3b illustrates another typical physical configuration in which storage controller 50 is divided into two separate storage controllers 58 and 59 connected by a link 70. The storage devices are provided separately as units 61 and 62, typically located in different facilities to provide increased reliability. As shown in FIG. 3b, writes from the host are sent to the shared memory of the primary storage controller 58 and then transferred to the storage device 61. Those same writes are also provided over the link 70 to storage controller 59 and to shared memory within that storage controller. Storage controller 59 then controls writing of the data to the secondary volumes 62. In each of FIGS. 3a and 3b the primary and secondary volumes are represented as logical volumes within the storage controller, but the data is actually stored in storage devices, typically arrays of hard disk drives, external to the storage controller. Each of FIGS. 3a and 3b illustrate typical physical configurations for implementation of the invention. This is discussed next in conjunction with the figures below.

Figure 4:
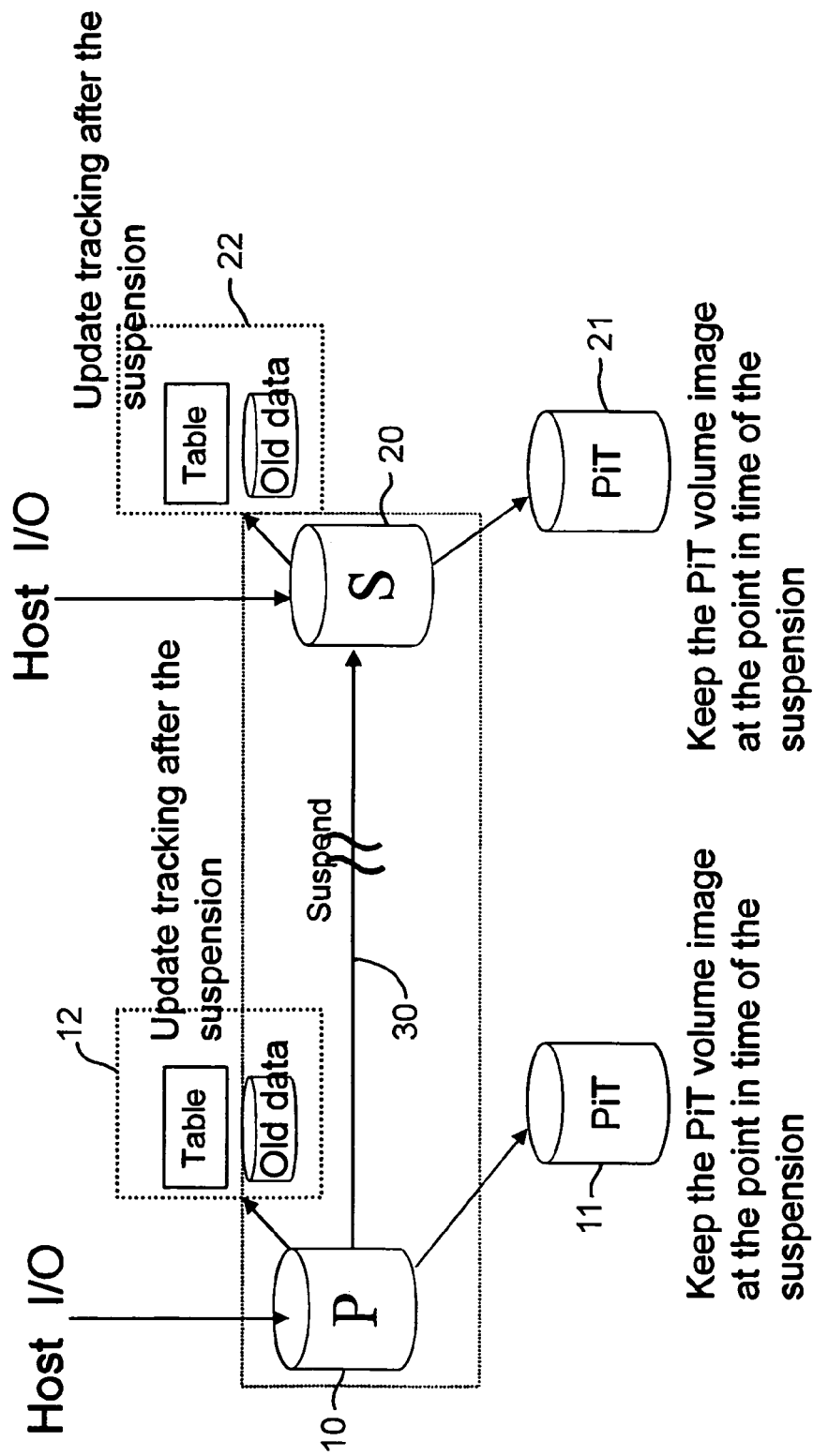
FIG. 4 is a diagram illustrating planed suspension in synchronous mode.

In accordance with this invention, when a pair is suspended, the volume images for both the primary volume and the secondary volume are retained for future use. Generally the method is to track the changes to the volume in a table stored in a memory, which may be backed up by a battery or other reliable power supply. As shown in FIG. 4, at the time of suspension, indicated by the break in link 30, a point-in-time image of the primary volume 10 is stored, for example, in storage 11. A similar point-in-time image of the secondary volume is stored in storage 21. While the suspension is ongoing, i.e. the link is broken, the updated data is stored in table 12 for the primary volume, and in table 22 for the secondary volume. As is discussed next, there are two different approaches for creating these images and tracking the subsequent data. Some of these differences result from the fact that there can be both planned and unplanned suspensions. Unplanned suspensions typically occur when there is an unplanned link failure, for example the communications pathway is disrupted by a failure. Planned suspensions occur for maintenance, changes in system configuration to add or subtract components, testing, etc.

Figure 5:
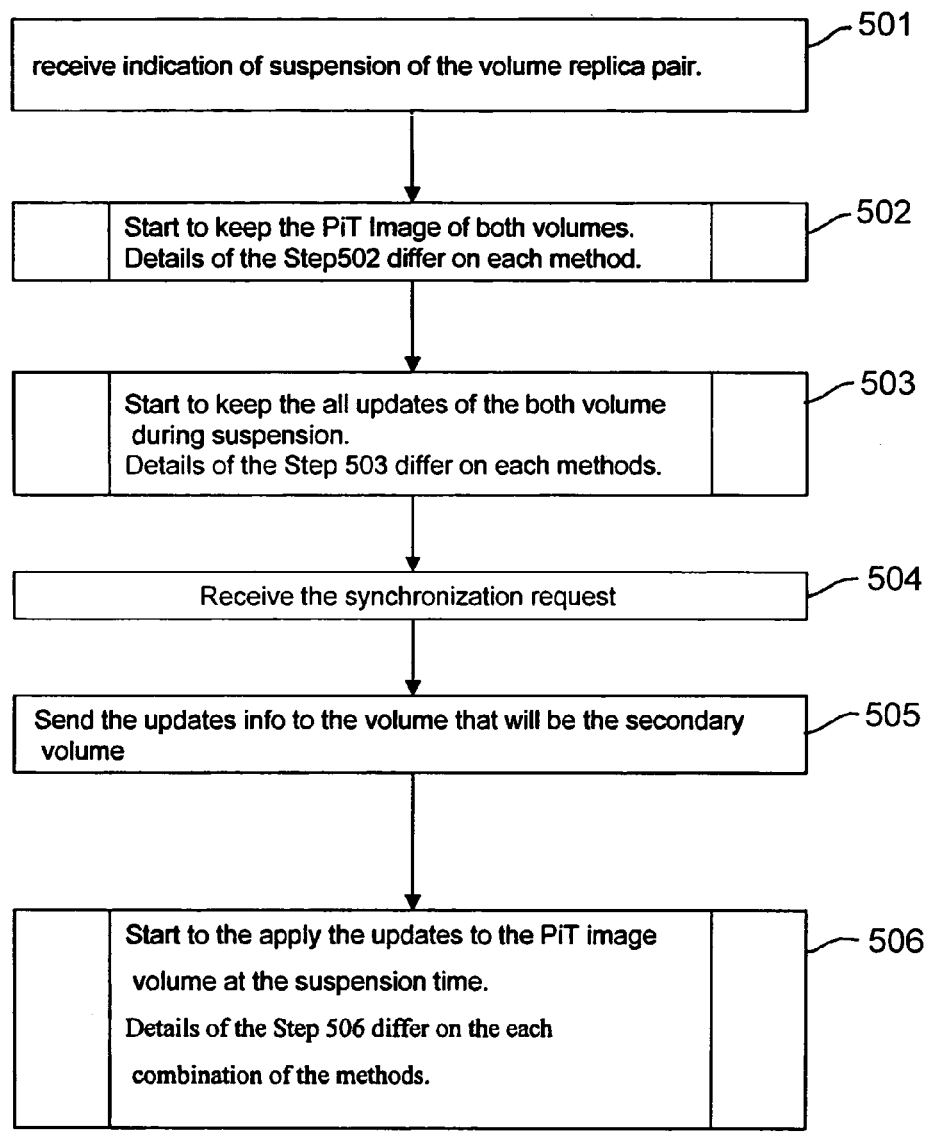
FIG. 5 is a flowchart illustrating steps from suspension to resynchronization.

FIG. 5 is a flow chart illustrating the steps from suspension to resynchronization according to one implementation of this invention. As shown there, at step 501 the system receives an indication of the suspension of the volume replica pair. This can result, as discussed above, by failure of the communications link between the primary (production) volume and the secondary (replica) volume. In this case, the system will store a point-in-time image of the contents of both volumes. The method by which this is achieved can differ, depending upon the cause of the suspension, as discussed below. At essentially the same time, each volume will begin to keep a record of all updates made to it during the suspension. As with step 502, the implementation of this step is also variable.

At step 504 a synchronization request is received, indicating that the communications link has been reestablished. Then, as shown in step 505, the updated information from the primary volume is sent to the secondary volume. Next, as shown in step 506, the updates are applied to the point-in-time image volume, starting with the suspension time. This step is also discussed in further detail below.

Figure 6:
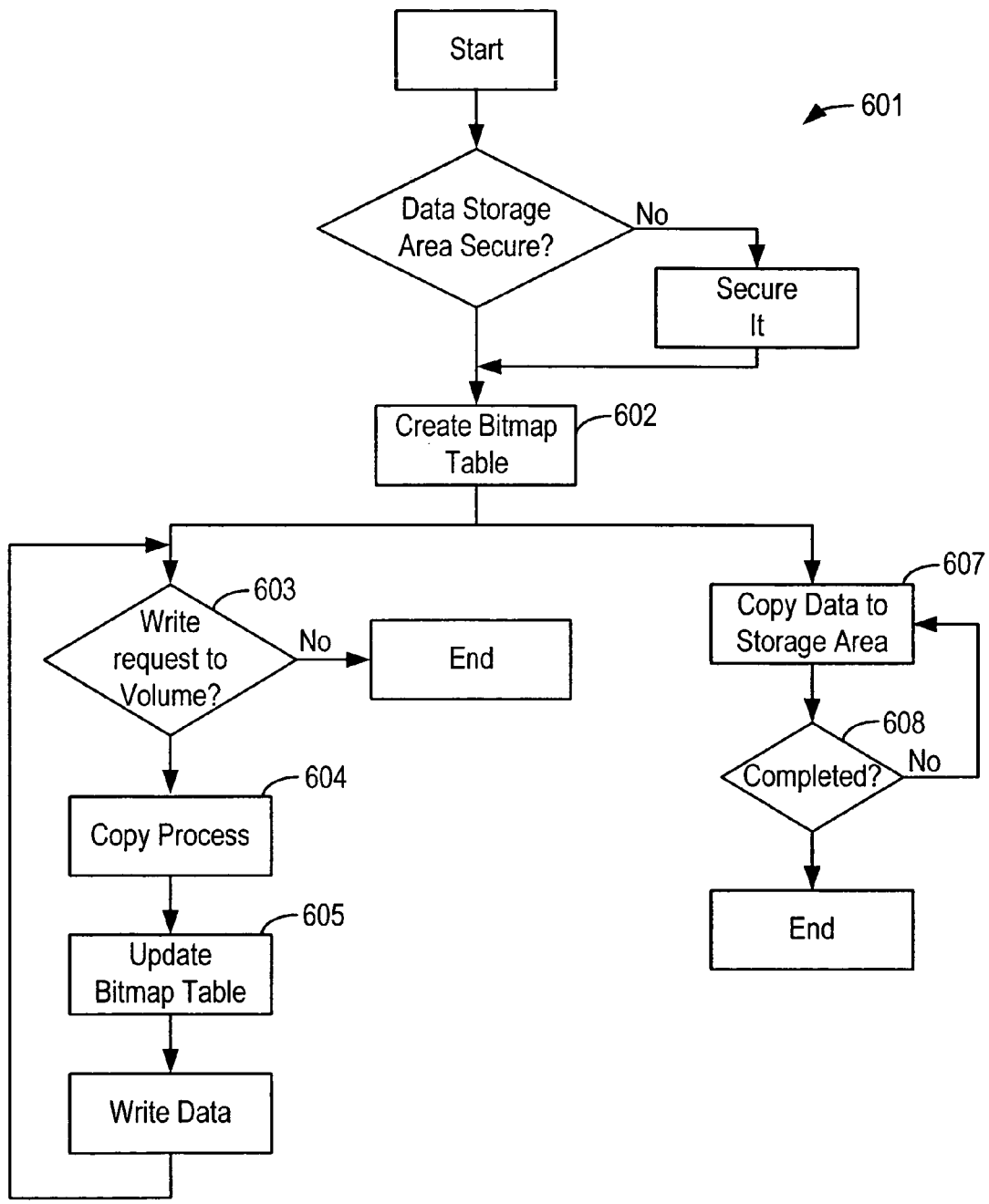
FIG. 6 is a flowchart illustrating full volume image retention.

FIG. 6 is a flowchart which illustrates the procedure for full volume image retention. Initially, a determination is made as to whether the data storage area has been secured, that is, protected for use. If it is not, as shown in step 601, the data storage area for the point-in-time volume image at the suspension point-in-time is secured. The process then moves to step 602. As shown there, a bitmap table is created to manage the copied and not yet copied data block to the point-in-time image. Next, as shown by step 603, a determination is made as to whether the write request is to a data block of the primary or secondary volume that has not been copied. At step 604, if the answer is yes, one or more copy processes are used to copy the data to the store area before writing the data to the volume. Next, as shown by step 605, the bitmap table is updated from 0 to 1, which indicates that the copy has been completed. Then at step 606, the data is actually written to the volume.

At the time this is occurring, a separate process is also under way as indicated by step 607 and 608. In step 607, according to the bitmap table, one or more copy processes copy the data to the store area by performing the operation in the background. It is used in the background until all of the point-in-time data of the volume are copied to the store area. At step 608, a check is made to determine if all the data has been copied and if it is not, the process goes back to step 607. If it has been copied, then the point-in-time image of the volume is completed.

Figure 7:
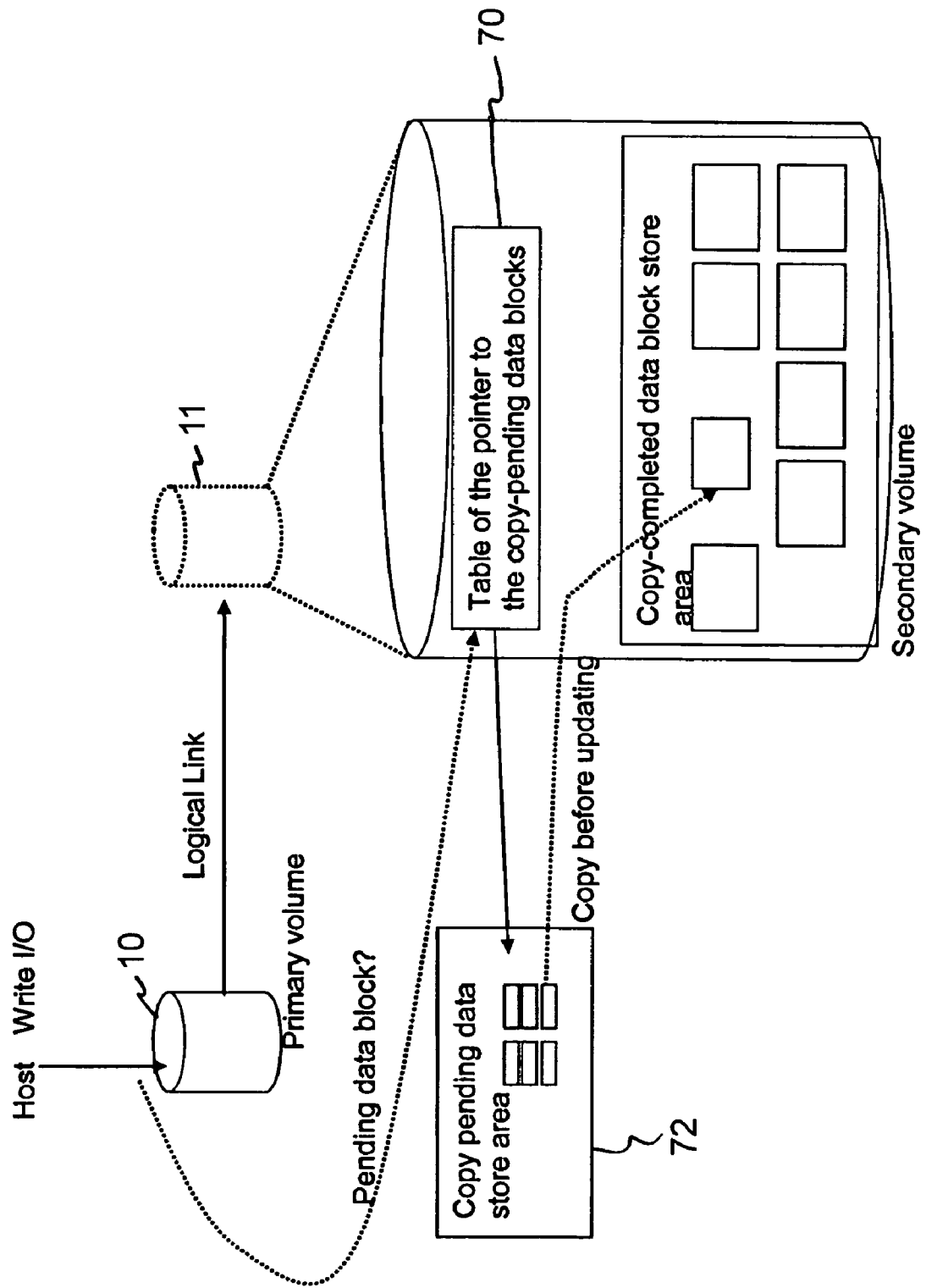
FIG. 7 is a diagram illustrating full image retention.

FIG. 7 is a diagram illustrating the point-in-time retention of a complete image of the volume. This operation may be used to implement step 502 in FIG. 5. As shown in FIG. 7, a series of operations are performed. Initially, the point-in-time volume is secured for data storage, if it has not already been so configured. This prevents other processes in the system from inadvertently writing data to this volume. Next, a bitmap 70 is created, which is used to manage the copied/not yet copied operation of copying data from the primary volume to the point-in-time image. As shown by the diagram, table 70 controls processor operations for moving data from the primary volume to the point-in-time volume through an intervening buffer 72. When a write request is made to a data block that has not yet been copied, the copy process will write the data into that block before it is copied. If a write request is received after it has been copied, the write request is not written into the point-in-time image, but is instead separately saved from later updating.

Figure 8:
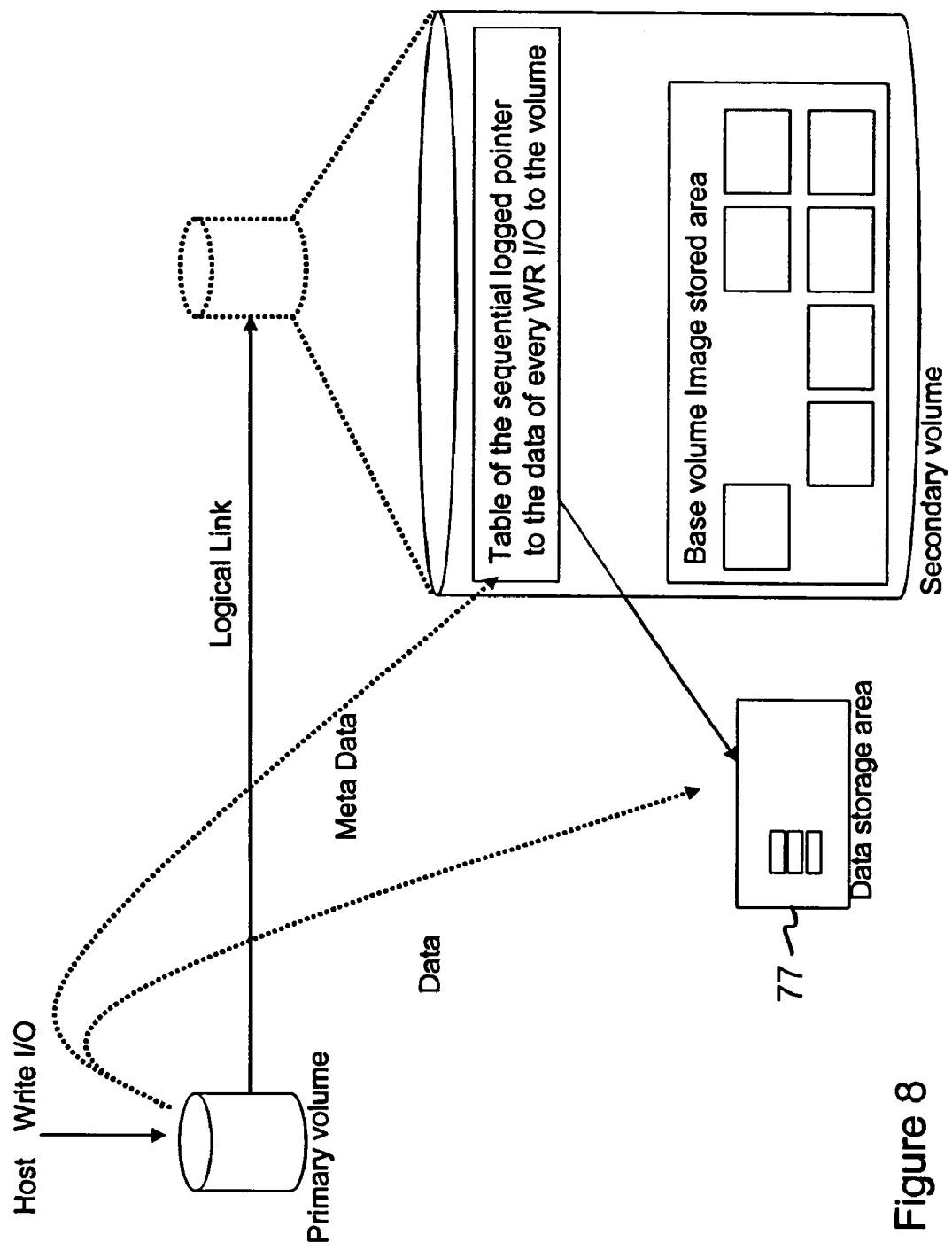
FIG. 8 is a diagram illustrating an overview of log-based volume management.

FIG. 8 is a diagram which illustrates use of the point-in-time image with a log-based volume management system. In these systems, data is stored in a separate location and metadata is stored on the point-in-time volumes as a table of sequential numbers and pointers of the data storage area where the data is stored for each write operation 77. For this operation, the sequence number for the last successful write (pre-suspension) to the volume is retained, then the base volume image plus all of the logs from the point-in-time of the base volume image to the retained sequence number are stored. The area for storage of the data can be selected from the pool of unused capacity, provided by a separate volume, or otherwise made available. Of course, once the base volume image is saved and the logs reflecting changes since that time are also saved, images made prior to that base volume image may be discarded or archived. Generally, every write operation to the volume is numbered sequentially with the associated data stored in the data storage area. A table maintains the relationship of the sequence number and the pointer of the location on the data storage area where the data is stored.

Figure 9:
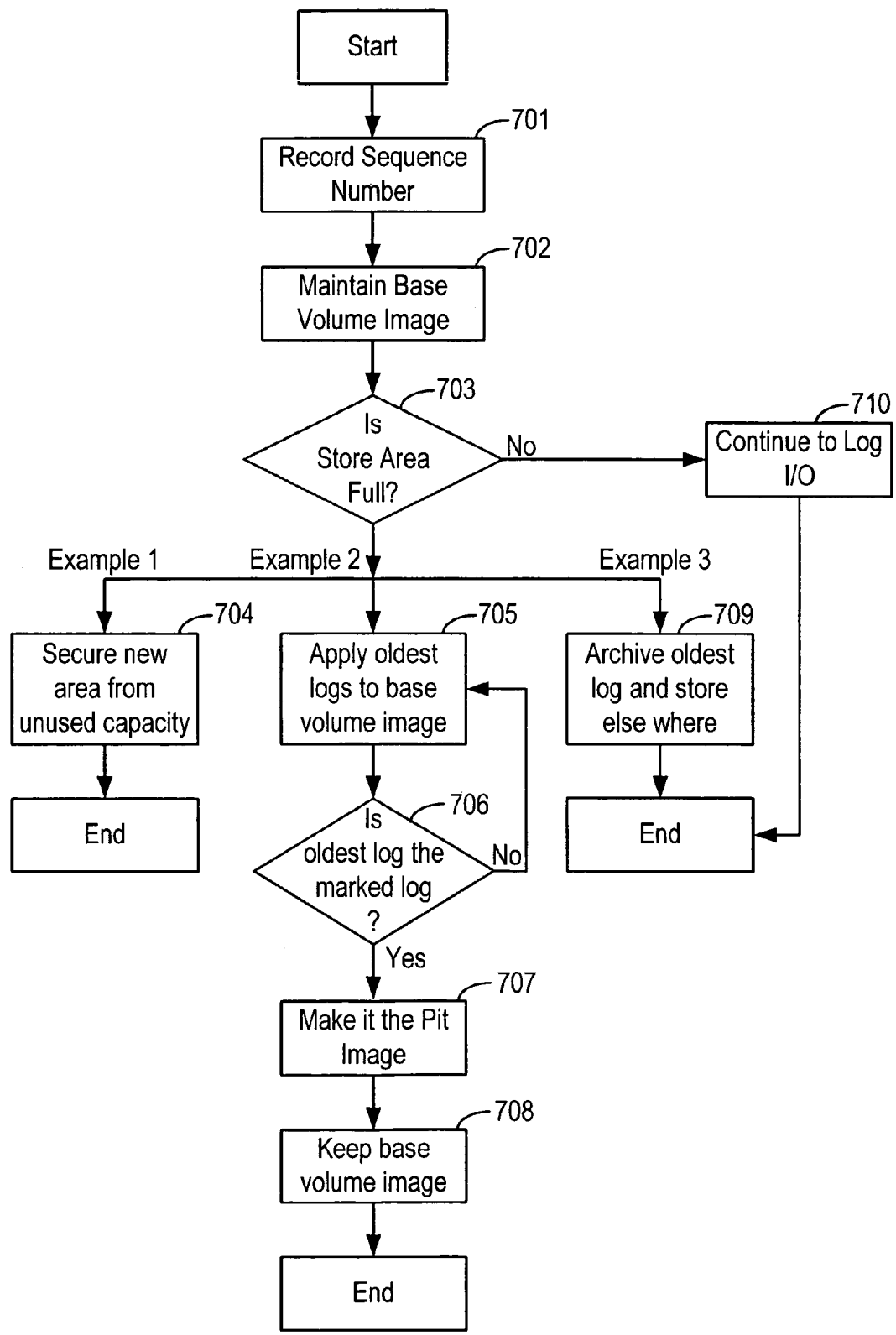
FIG. 9 is a flowchart illustrating log-based volume management for image retention.

FIG. 9 is a flowchart illustrating log-based volume management for point-in-time image retention. As shown there, at step 701 the sequence number of the log of the last write IO operation to the volume is memorized. Then, as shown by step 702 the base volume image and the logs from the point-in-time of the base volume image are maintained until that sequence number. Then at step 703 a determination is made as to whether the store area for the log data is full. If it is not full, as shown by step 710, the system continues to log the new write data. On the other hand, if the store area is full, three examples are shown.

In the example represented by step 704, the new store area is secured automatically from the pool of unused capacity. An alternative approach as shown by steps 705, et seq., is shown as well. At step 705, if the store area of log data is full, then the system applies the oldest logs of the base volume image store area and makes that area available for the new logs. A test is done at step 706 to determine whether the oldest log is the marked log at the time of suspension. If it is not, the process reverts to step 705. If it is, the process moves to step 707. At that step, the log and base volume image become the point-in-time image at the time of the suspension. Then at step 708 the base volume image is maintained. A third example is provided by step 709. At that step the oldest logs are archived and stored in an archive data store area to provide more space for storage.

Figure 10:
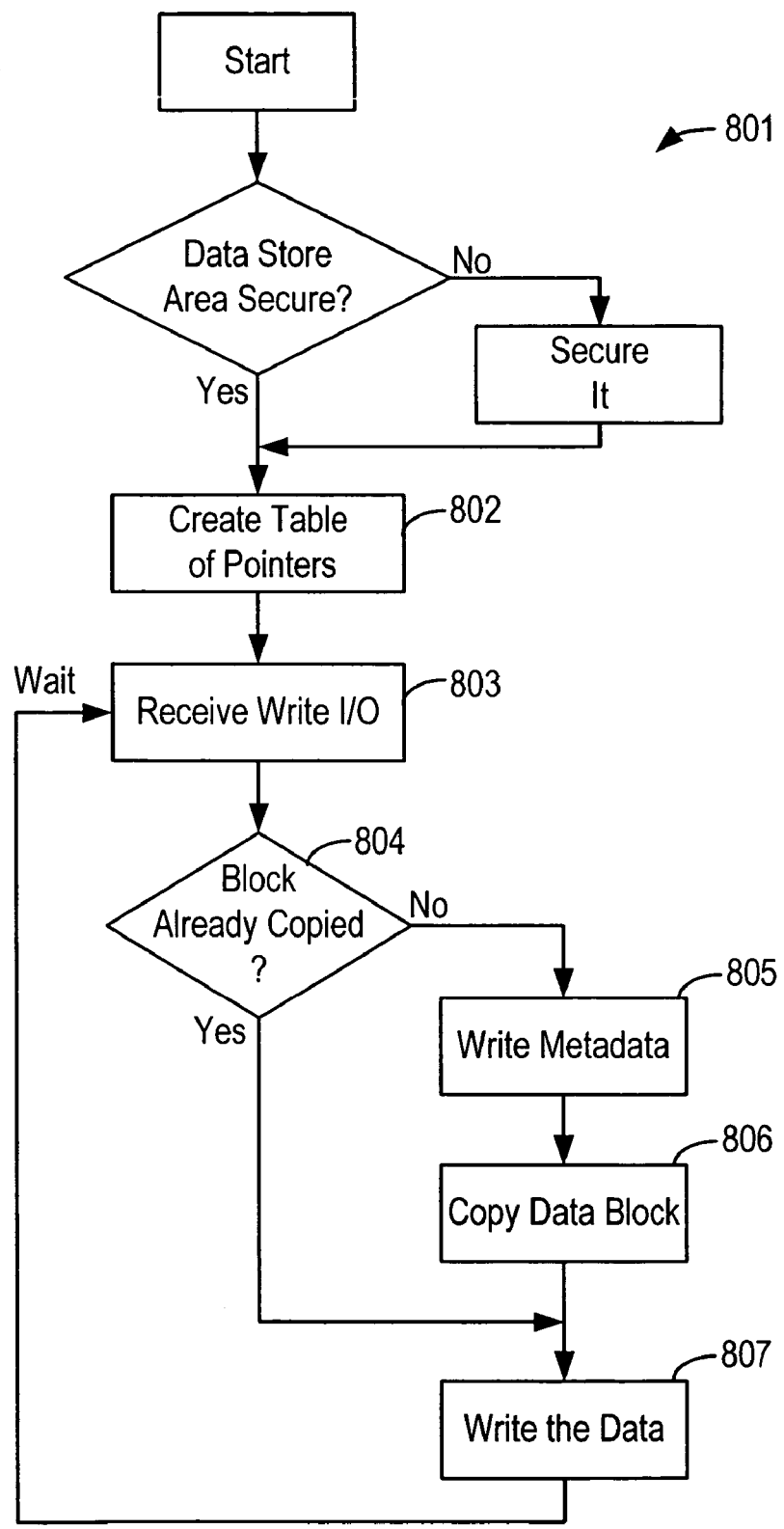
FIG. 10 is a flowchart illustrating use of an old data table to recover a volume image at the time of suspension.

FIG. 10 is a flowchart illustrating this process. As shown, the process begins at step 801 in which the data store area is secured, if it has not already been previously reserved. Then at step 802 a table of pointers to the old data storage area is created. At step 803 the system waits for the write request operations to the volume. At step 804 a test is made as to whether the blocks to be written by that write operation have been completed. If they have not, the process flow moves to step 805 where the pointer or metadata for the old data block store area is written to the table. Then at step 806 the data block is copied to the old data storage area and at step 807 the data itself is written. On the other hand, if at step 804 the test is positive, then the process flow moves to step 807 where the data is written. The process flow then returns to step 803 to await the next IO operation requesting a write.

Figure 11:
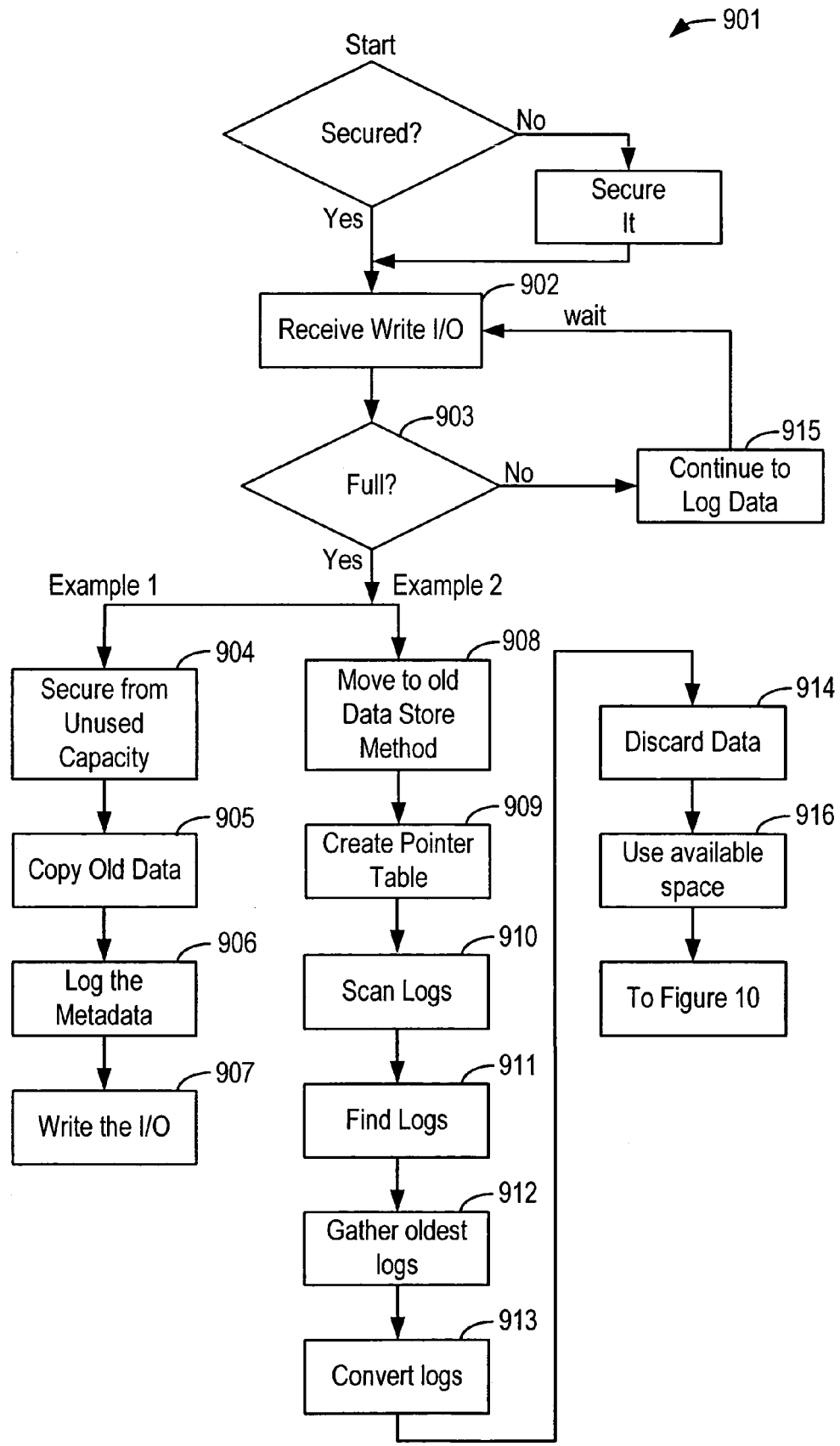
FIG. 11 is a diagram illustrating an old data tracking log.

FIG. 11 is a diagram illustrating creation of the old data tracking log. This keeps the old data as the log on every update to the volume. As shown there, beginning at step 901 the store area is secured if not already preserved. Then at step 902 the system waits for the IO write operation, and at step 903 a test is performed as to whether the old data store area is full. There are three results. If the store area is not full as shown by step 915, then the system continues to log the old data as the new write requests arrive. On the other hand, if the store area is full, then two examples are provided. First, as shown by step 904 one approach is to secure the new storage area automatically from the pool of unused capacity. Following this step, the old data is copied to the store area. Then in step 906, the metadata is logged and at step 907 the write operation is performed.

A second example of the system operation is shown by steps 908 through 914. In this example at step 908 the system moves to an old data store approach. At step 909 the pointer tables for the old data store area are created. At step 910 all logs are scanned, while at step 911 an operation is performed to determine the logs for the same data blocks. At step 912 the logs for the same data blocks are gathered to the oldest log. Then at step 913 the logs are converted to a pointer table which indicates the oldest data of the blocks in the store area. At step 914 the data of the blocks that is not oldest is discarded, and at step 915 the area created by the preceding steps is used for storage.

If the suspension is unplanned, the last write IO operation may or may not be copied to the secondary volume. To overcome this, the last write operation is treated as a write operation to a volume after the initiation of the suspension. Thus if it was already written to the primary volume and not to the secondary volume, then the IO operation is treated as an IO after the suspension. When the system is resynchronized, that IO operation is sent to the secondary again as being a difference caused by the suspension.

Figure 12:
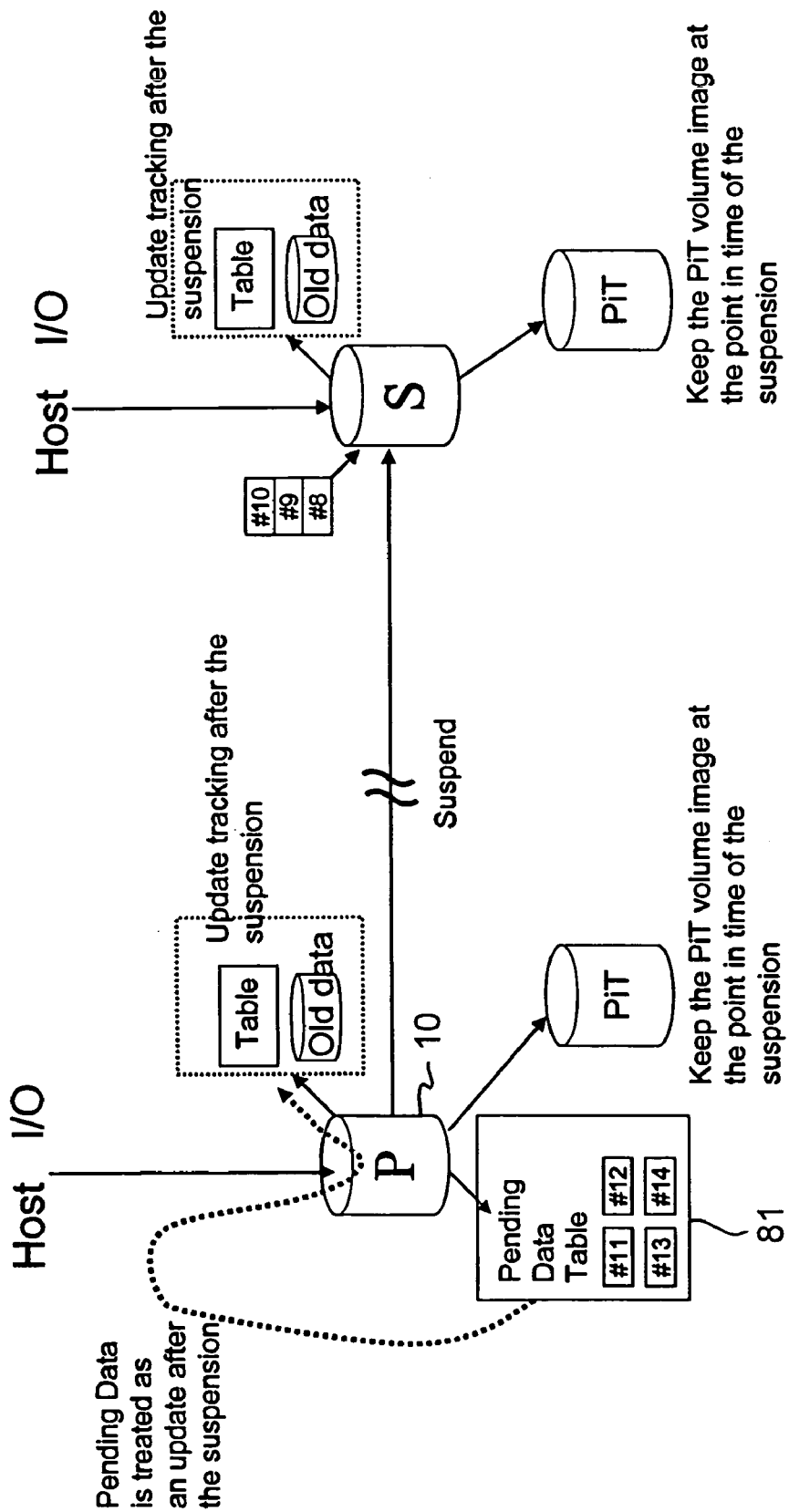
FIG. 12 is a diagram illustrating planned or unplanned suspension in asynchronous mode.

FIG. 12 is a diagram illustrating an overview of planned and unplanned suspensions in a synchronized mode or remote replica functions on both primary and secondary volumes. The situation may have caused the last write operation to already have been (or not to have been) copied to the secondary volume completely.

Figure 13:
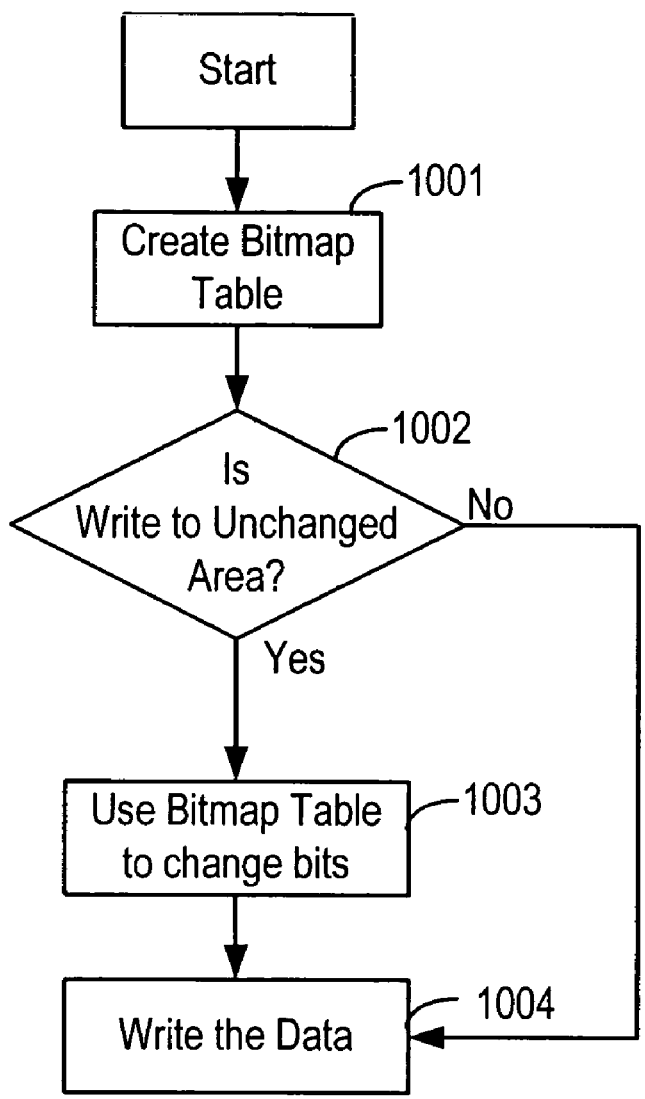
FIG. 13 is a diagram illustrating creation of a bit map table.

FIG. 13 is a flowchart illustrating one method for tracking updates to the volume after the suspension. The method illustrated is to track the change block. As shown in step 1001, a bitmap table is created to manage the changed/not yet changed data block to the volumes. Then at step 1002, a determination is made of whether the write request to the data block of the primary or secondary volume is not a changed data block. As shown by the "no" decision, if a block has already been changed, the bit is already changed and the process continues by writing the data. On the other hand, as shown by step 1003, if the determination is made that the decision is "yes," then according to the bitmap table, the bit is changed from 0 to 1 or vice versa before being written.

Figure 14A:
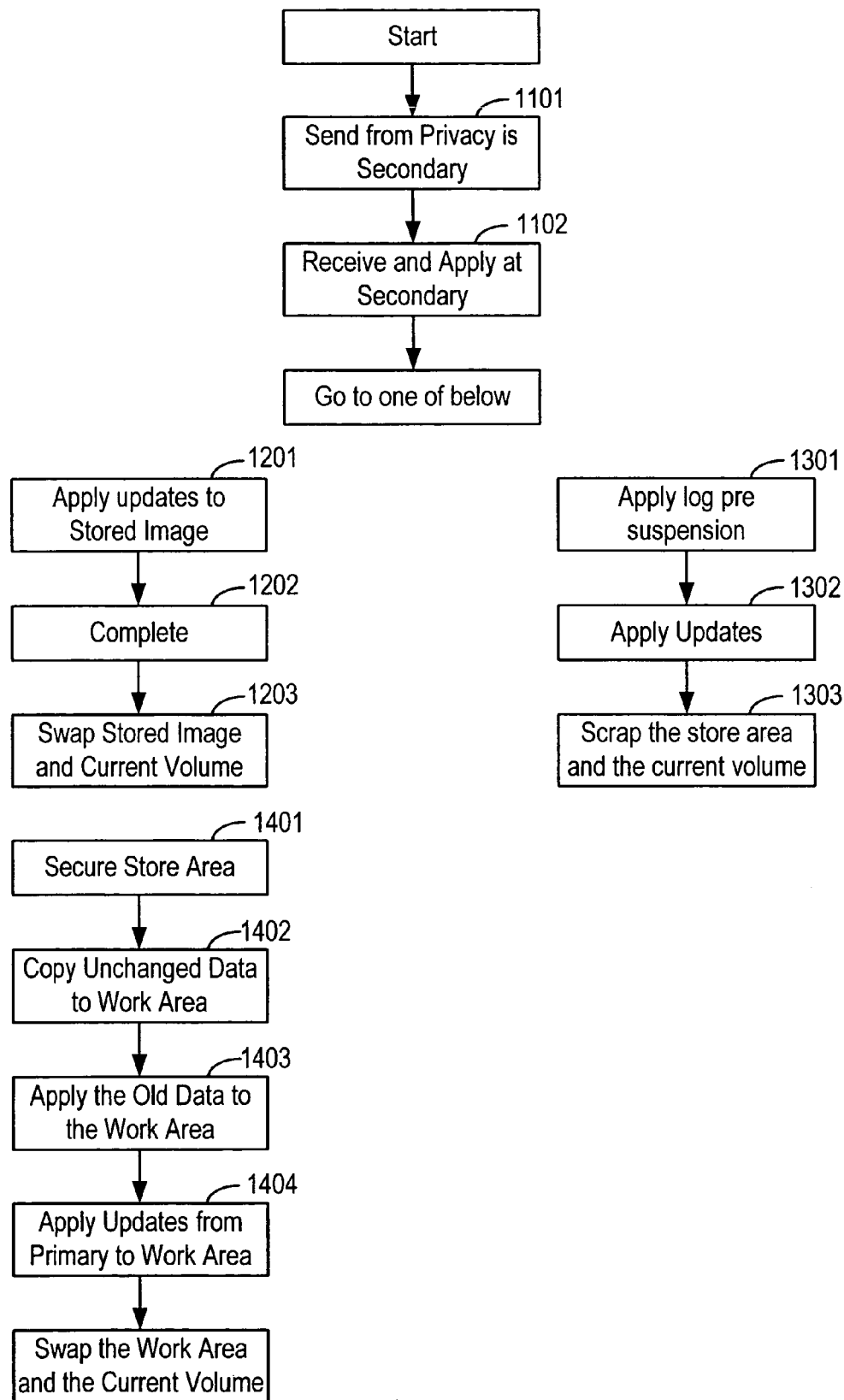
FIG. 14 is a diagram illustrating resynchronization of a replication volume pair.
Figure 14B:
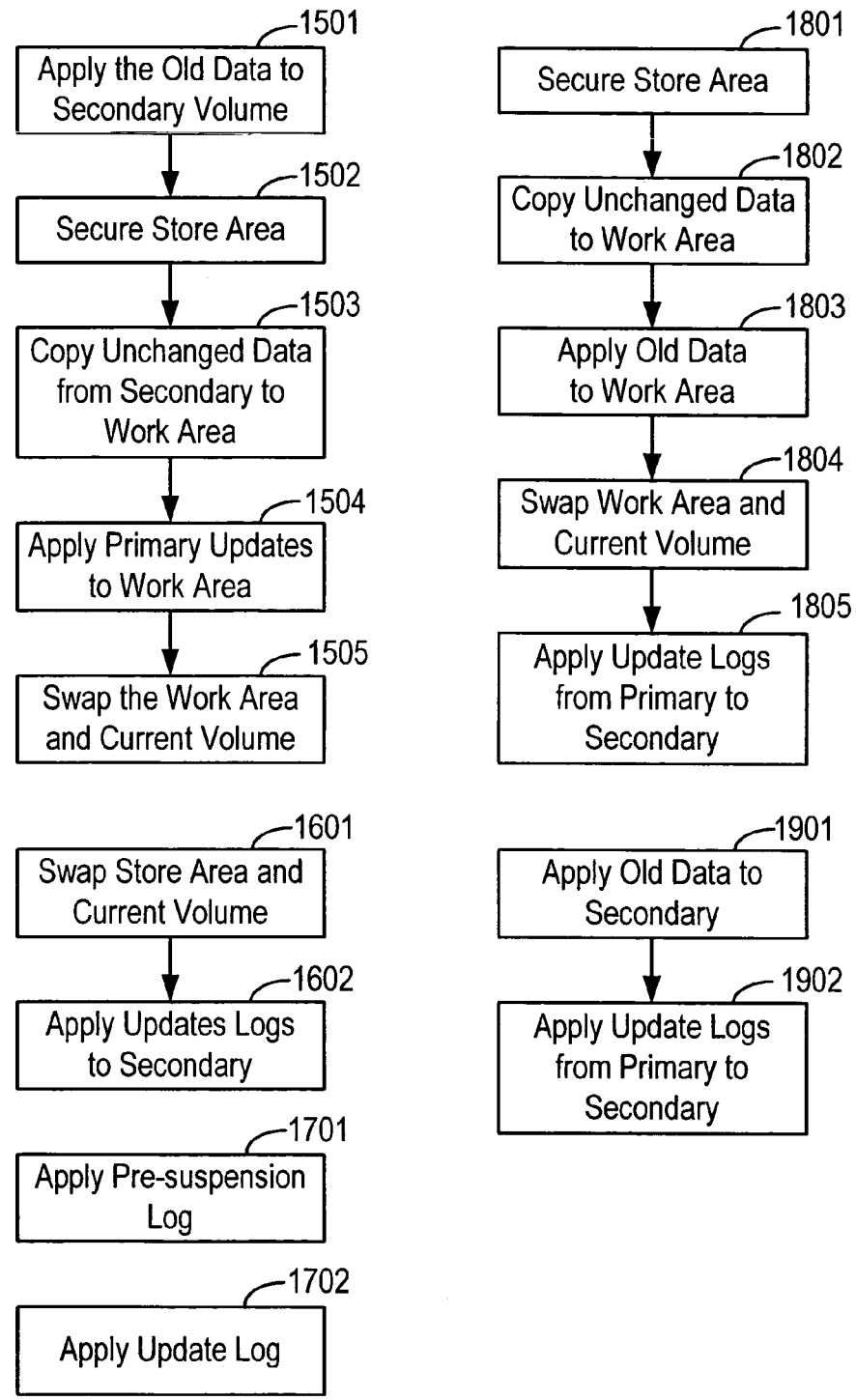

The process for resynchronization is shown in FIG. 14. Three different examples are illustrated. Each example, however, begins with step 1101, in which from the primary volume side of the link, updated information (metadata and data) are sent to the volume which becomes the secondary volume after the resynchronization. Then at step 1102, on the secondary volume side of the link, the data is received from the primary volume and the updated information is applied from the primary volume to the point-in-time image at the time of suspension. Three different examples are provided for implementing step 1102.

In the first example as shown by step 1201, the updates are applied to the point-in-time image store area. Once this is completed, as shown by step 1202, the volume of the point-in-time store area and the current volume are swapped, keeping the logical volume ID the same as it was originally so that it may be recognized later. The swapping of the volume can be done first and then the updates applied, or the updates applied and then the volume swapped.

Flowchart steps 1301 through 1303 illustrate a second example for implementation of step 1102. As shown there, in step 1301 the log from the base point-in-time image is applied until the time of the suspension. Then at step 1302 the updates to the volume are applied, and at step 1303 the volume of the point-in-time store area in the current volume are swapped keeping the logical volume ID the same as the original volume to allow host recognition.

Flowchart steps 1401 to 1405 illustrate another approach. In this approach the old data table plus the bitmap are used to recover the image. As shown by step 1401, the store area is first secured for resynchronization. Then at step 1402 unchanged data blocks of the volume are copied to the work area according to the old data table. At step 1403 the old data is applied to the work area according to the old data table, and then at step 1404 the updates from the primary to the work area are applied. At step 1405 the volume for the work area and the current volume are swapped, but the logical volume ID is maintained for the new volume to facilitate host interaction.

The flowchart steps numbered 1500 and above relate to the combination of the old data tracking table plus the bitmap. As shown in step 1501 the old data is applied to the secondary volume according to the old data tracking table. Then at step 1502 the area is secured for resynchronization. At step 1503 the unchanged data blocks of the secondary volume are copied to the work area according to the resynchronization. At step 1503 the unchanged data blocks of the secondary volume are copied to the work area according to the bitmap table from the primary. At step 1504 updates are applied from the primary to the work area, and at step 1505 the volume of the work area in the current volume are swapped, again keeping the logical volume ID the same as it was originally to facilitate host volume recognition.

The flowchart at step 1600 illustrates another technique for recovering a full volume image. As shown by step 1601 the volume of the point-in-time store area and the current volume are swapped keeping the logical volume ID the same as the original volume. Then at step 1602 the update logs are applied to the secondary volume. The flowchart for step 1700 is also shown. As indicated, the log from the base point-in-time image is applied at step 1701, and then the update logs are applied as shown by step 1702.

The steps numbered 1801 through 1805 are discussed next. In step 1801 the store area is secured for resynchronization. Then in step 1802 the unchanged data blocks of the volume are copied to the work area. At step 1803 the old data is applied to the work area according to the old data table, and at step 1804 the volumes are swapped, again keeping the logical volume ID the same as before the swap. At step 1805 the step of applying the update log from the primary volume to the secondary volume is shown. Of course, if it is not necessary to prepare for the sudden failure during resynchronization, the old data can be applied to the secondary volume directly.

Steps 1900 illustrate the use of the old data tracking table plus a log-based system. As shown in step 1901 the old data is first applied to the secondary volume according to the old data tracking table. Then as shown in step 1904, the update logs from the primary volume are passed to the secondary volume.

Figure 15:
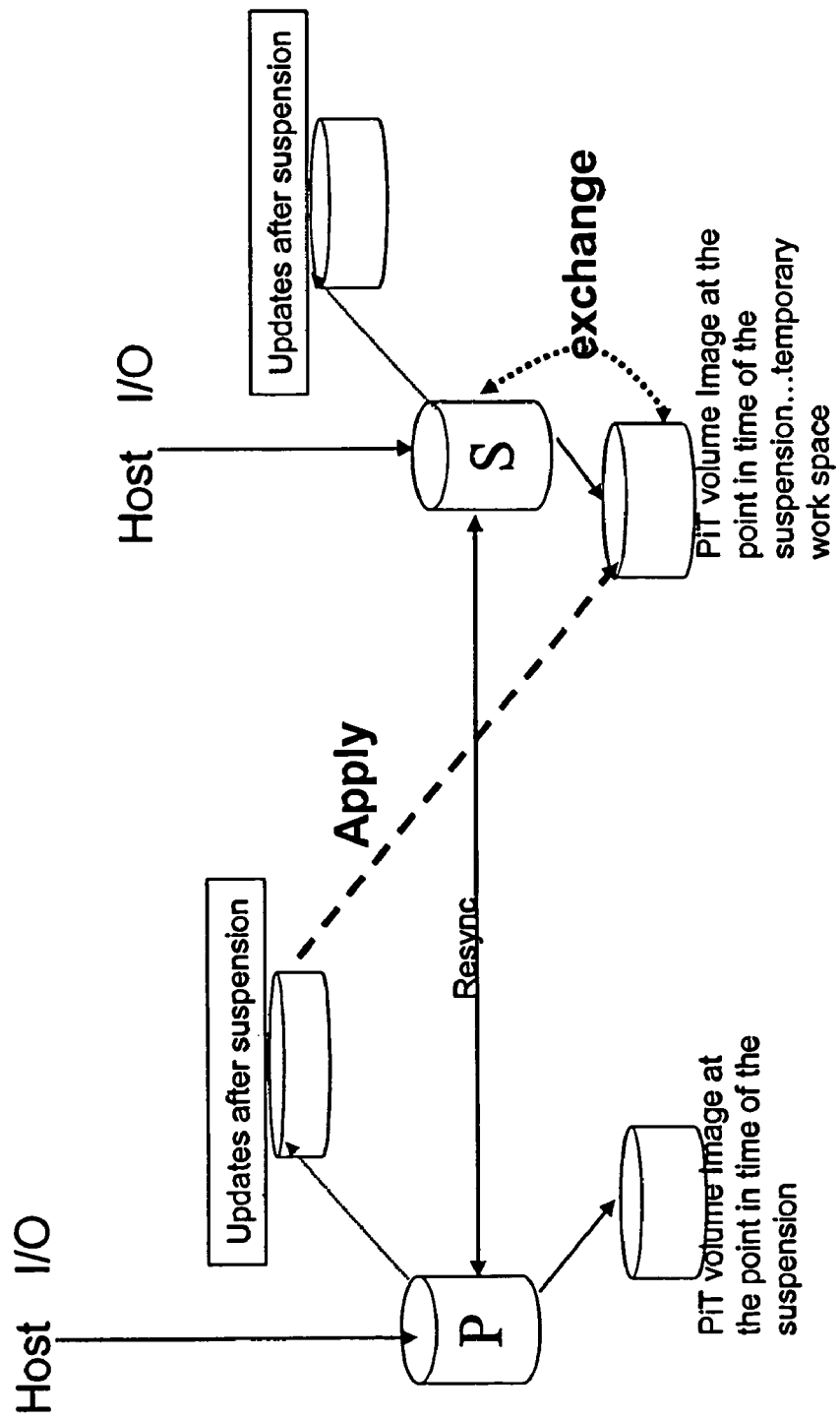
FIG. 15 is a diagram illustrating a combination of the old data tracking table and use of a bit map.
Figure 16:
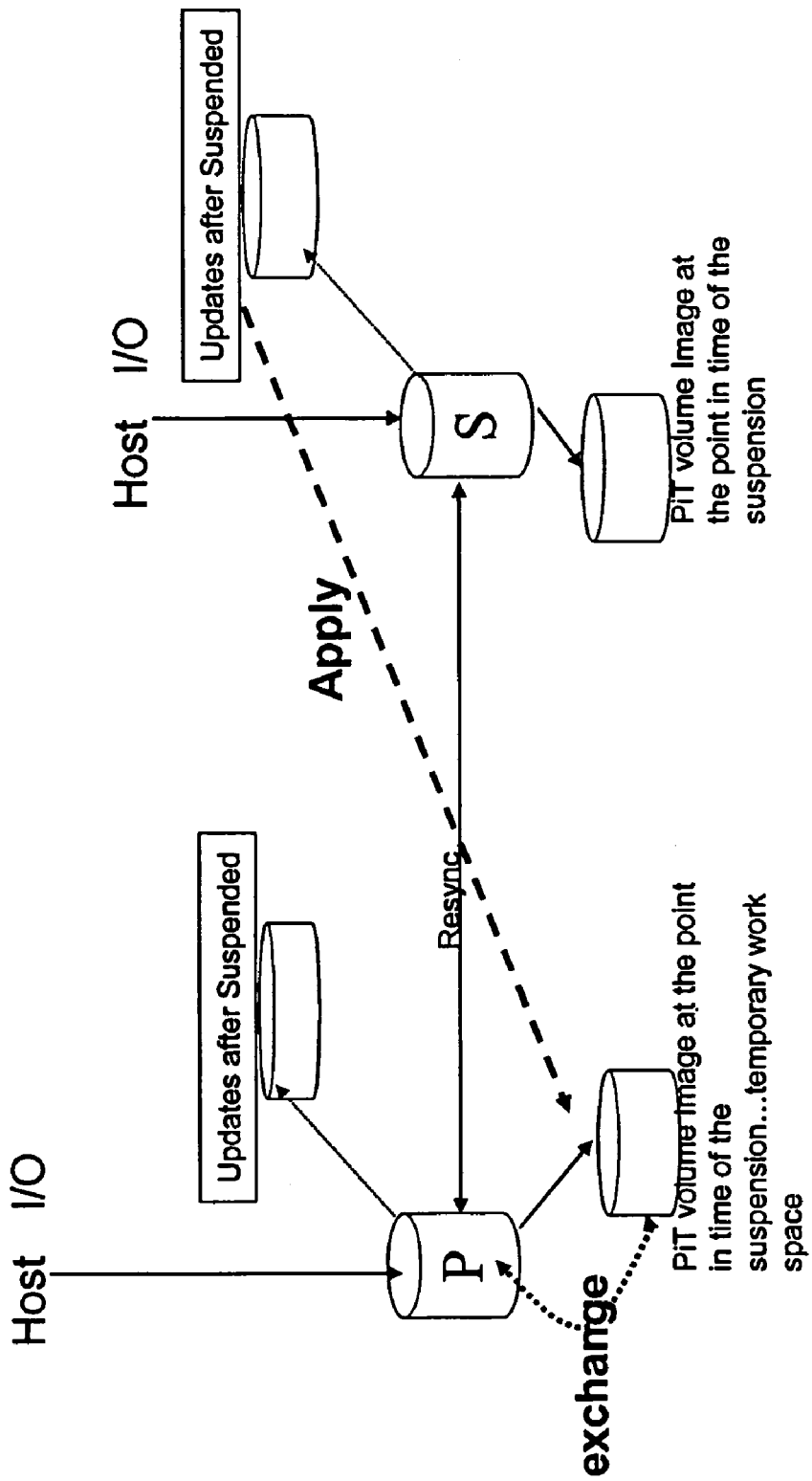
FIG. 16 is a diagram illustrating full volume image methods.

FIGS. 15 and 16 illustrate an overview of resynchronization. As shown in FIG. 15, a point-in-time volume image is made at the time of suspension and updates after that suspension are tracked separately on the primary storage side. The secondary volume also tracks updates after the suspension and maintains a point-in-time image at the time of the suspension. Once a communication link is reestablished, then the updates after the suspension can be tracked. Those updates are applied from the primary to the secondary. As shown in FIG. 16, also after the suspension, the updates can be applied from the secondary to the primary.

FIG. 16 illustrates how the old data table can be used to recover the point-in-time volume image at the time the suspension occurred. As shown earlier, initially the data storage area is reserved or secured to assure its availability. Then a table of pointers to this old data table are made, as shown in block 81. When rights are received at the primary volume 10, they are checked to determine whether they have previously been copied. If the determination is that they have not been copied, then the metadata for the old data block is stored to the table and the data block itself is copied to the storage area. Once that process is complete for all data blocks, the system waits for the next write request from the host.

What is claimed is:

1. In a system having a primary storage volume having first data stored thereon and a secondary storage volume having second data stored thereon, the primary storage volume coupled to the secondary storage volume by a communications link, a method of restoring data after a suspension of the link, the method comprising:

upon suspension of the link, maintaining a first image of the first data stored on the primary volume and maintaining a second image of second data stored on the secondary volume;

tracking updates to the first data and updates to the second data after suspension of the link;

revising the maintained first image of the first data stored on the primary volume to account for the updates to thereby provide a complete first data image for use when the link is restored;

revising the maintained second image of the second data stored on the secondary volume to account for the updates to thereby provide a complete second data image for use when the link is restored; and based on the complete first data image and the complete second data image, copying data between the primary volume and the secondary volume when the link is restored to thereby resynchronize the primary volume and the secondary volume.

2. A method as in claim 1 wherein the step of maintaining an image comprises on at least one of the primary storage volume and the secondary storage volume:

creating a bitmap table to record a status of all of the data on the volume;

establishing a reserved area for storage of the data; and copying all of the data to the reserved area.

3. A method as in claim 1 wherein the step of maintaining an image comprises on at least one of the primary storage volume and the secondary storage volume comprises maintaining a record of a log sequence number at the time of suspension of the link.

4. A method as in claim 1 wherein the step of maintaining an image comprises creating an old data table to maintain a record of all of the data at the time of suspension of the link.

5. A method as in claim 1 wherein the step of tracking updates comprises on at least one of the primary storage volume and the secondary storage volume creating a bitmap table to record all blocks of data which are updated after suspension of the link.

6. A method as in claim 1 wherein the step of tracking updates comprises on at least one of the primary storage volume and the secondary storage volume recording updates to the data as a record of the log sequence numbers occurring after suspension of the link.

7. A system for restoring data after an interruption in a communications link comprising:

a primary storage volume having first data stored thereon;

a secondary storage volume having second data stored thereon, the primary storage volume being coupled to the secondary storage volume by the communications link;

a first storage controller for maintaining a first image of the first data stored on the primary volume upon the interruption in the communications link;

a second storage controller for maintaining a second image of the second data stored on the secondary volume upon the interruption in the communications link;

a first update storage for storing updates to the first data after the interruption in the communications link;

a second update storage for storing updates to the second data after the interruption in the communications link;

the first storage controller revising the maintained first image of the first data stored on the primary volume to account for the updates to thereby provide a complete first data image for use when the link is restored;

the second storage controller revising the maintained second image of the second data stored on the secondary volume to account for the updates to thereby provide a complete second data image for use when the link is restored; and at least one of the first and the second storage controllers revising the data on the secondary storage volume to match the data on the primary storage volume after the link is restored, based on the complete first data image and the complete second data image.

8. A system as in claim 7 wherein first storage controller maintains an image of the primary storage volume upon interruption of the link by creating a bitmap table to record a status of all of the data on the volume, establishing a reserved area for storage of the data; and copying all of the data to the reserved area.

9. A system as in claim 7 wherein the storage controllers store on a selected volume an image of the volume by maintaining a record of a log sequence number at the time of suspension of the link.

10. A system as in claim 7 wherein the storage controllers create an old data table to maintain a record of all of the data at the time of suspension of the link.

11. A system as in claim 7 wherein the storage controllers each create a bitmap table to record all blocks of data which are updated after suspension of the link.

12. A sub-system for restoring data after an interruption in a communications link comprising:

a primary storage volume having first data stored thereon;

a first storage controller for maintaining a first image of the first data stored on the primary volume upon the interruption in the communications link;

a first update storage for storing updates to the first data after the interruption in the communications link; and the first storage controller revising the maintained first image of the first data stored on the primary volume to account for the updates to thereby provide a complete first data image for use when the link is restored.

13. A sub-system as in claim 12 wherein the first storage controller maintains an image of the primary storage volume upon interruption of the link by creating a bitmap table to record a status of all of the data on the volume, establishing a reserved area for storage of the data; and copying all of the data to the reserved area.

14. A sub-system as in claim 12 wherein the first storage controller stores on a selected volume an image of the volume by maintaining a record of a log sequence number at the time of suspension of the link.

15. A sub-system as in claim 12 wherein the first storage controller creates an old data table to maintain a record of all of the data at the time of suspension of the link.

16. A sub-system as in claim 12 wherein the storage controllers each create a bitmap table to record all blocks of data which are updated after suspension of the link.

* * * * *